(12) United States Patent
Feero et al.

(10) Patent No.: US 9,880,961 B2
(45) Date of Patent: Jan. 30, 2018

(54) ASYNCHRONOUS BRIDGE CIRCUITRY AND A METHOD OF TRANSFERRING DATA USING ASYNCHRONOUS BRIDGE CIRCUITRY

(71) Applicant: ARM LIMITED, Cambridge (GB)

(72) Inventors: Brett Stanley Feero, Austin, TX (US); Klas Magnus Bruce, Austin, TX (US)

(73) Assignee: ARM Limited, Cambridge (GB)

( * ) Notice: Subject to any disclaimer, the term of this patent is extended or adjusted under 35 U.S.C. 154(b) by 769 days.

(21) Appl. No.: 14/092,417

(22) Filed: Nov. 27, 2013

(65) Prior Publication Data

US 2015/0149809 A1 May 28, 2015

(51) Int. Cl.
*G06F 1/04* (2006.01)
*G06F 1/12* (2006.01)
*G06F 13/40* (2006.01)

(52) U.S. Cl.
CPC .. *G06F 13/4059* (2013.01); *G06F 2213/0038* (2013.01)

(58) Field of Classification Search
CPC . G06F 1/10; G06F 13/4059; G06F 2213/0038
(Continued)

(56) References Cited

U.S. PATENT DOCUMENTS 6,442,223 B1 * 8/2002 Dreps ............... H04L 7/0012
375/354
6,996,640 B1 2/2006 Hill et al.
(Continued)

FOREIGN PATENT DOCUMENTS

WO WO 2012/160108 11/2012

OTHER PUBLICATIONS

UK Search Report dated Apr. 2, 2015 in GB 1417550.9, 3 pages.
(Continued)

*Primary Examiner* — Robert Cassity
(74) *Attorney, Agent, or Firm* — Nixon & Vanderhye P.C.

(57) ABSTRACT

Asynchronous bridge circuitry provides data communication between source circuitry 4 in a source clock domain and destination circuitry 12 in a destinations clock domain. The asynchronous bridge circuitry includes first-in-first-out buffer 20, transmission path circuitry 14, which has an input end coupled to the source circuitry and an output end coupled to the first-in-first-out buffer. The transmission path circuitry has a transmission delay corresponding to a plurality of source clock cycles. Write pointer circuitry 22 located within the source clock domain at the output end 18 of the transmission path circuitry so as to generate a write pointer for the first-in-first-out buffer. Transmission control circuitry 26 located within the source clock domain at the input end 16 of the transmission path circuitry is configured to generate a transmission control signal which controls whether or not the source circuitry is permitted to send data. The transmission control circuitry includes tracking circuitry which stores one or more tracking values for tracking respective state variables of the first-in-first-out buffer and controlling whether or not the transmission control circuitry permits the sending of data from the source to the destination in dependence upon the generated control circuitry.

17 Claims, 6 Drawing Sheets

(58) Field of Classification Search
USPC .......................................................... 713/600
See application file for complete search history.

(56) References Cited

U.S. PATENT DOCUMENTS

| | | | |
|---|---|---|---|
| 7,366,935 B1* | 4/2008 | Swenson | G06F 5/14 345/558 |
| 2004/0022099 A1 | 2/2004 | Ozawa | |
| 2006/0259669 A1* | 11/2006 | Dockser | G06F 5/06 710/70 |
| 2010/0111117 A1* | 5/2010 | Kolinummi | G06F 13/4059 370/503 |
| 2013/0251006 A1 | 9/2013 | Maji et al. | |
| 2013/0268705 A1 | 10/2013 | Maji et al. | |
| 2013/0315236 A1* | 11/2013 | Scrobohaci | H04L 47/52 370/389 |

OTHER PUBLICATIONS

Yu, Z. et al., "AsAP: An Asynchronous Array of Simple Processors", IEEE Journal of Solid-State Circuits, vol. 43, No. 3, (Mar. 2008), pp. 695-705.

Teehan, P. et al.,"A Survey and Taxonomy of GALS Design Styles", Globally Asynchronous, Locally Synchronous Design and Test, (Sep.-Oct. 2007), pp. 418-428.

Chakraborty, A. et al., "A Minimal Source-Synchronous Interface", IEEE, (2002), pp. 443-447.

Tran, A.T. et al., "A Low-Cost High-Speed Source-Synchronous Interconnection Technique for GALS Chip Multiprocessors", IEEE, (2009), pp. 996-999.

* cited by examiner

ASYNCHRONOUS BRIDGE CIRCUITRY AND A METHOD OF TRANSFERRING DATA USING ASYNCHRONOUS BRIDGE CIRCUITRY

BACKGROUND

This invention relates to the field of data processing systems. More particularly, this invention relates to asynchronous bridge circuitry for use in transferring data from source circuitry operating in a source clock domain to destination circuitry operating in a destination clock domain that is not synchronised with respect of the source clock domain.

It is known to provide data processing apparatus, such as system-on-chip integrated circuits, which include multiple asynchronous clock domains. Part of the apparatus will operate under control of a source clock signal and another part of the apparatus will operate under control of a destination clock signal that is asynchronous with source clock signal. When it is desired to pass data (signals) between source circuitry in the source clock domain and destination circuitry in the destination clock domain, then one way of achieving this is to use asynchronous bridge circuitry incorporating a first-in-first-out buffer. The first-in-first-out buffer may be located within the source clock domain and serve to store data which is to be written to the destination circuitry in the destination clock domain. Metastability resolving circuitry and synchronising circuitry may be provided across the clock domain boundary and permit data to be read from the first-in-first-out buffer by the destination circuitry in synchronism with the destination clock.

As the speed of data processing apparatus increases, and the relative time delay in transmitting data from a source to our destination increases compared with the processing speed, it becomes more difficult to control transfer of data across the clock domain boundary while keeping the overhead associated with the circuitry to achieve this relatively low.

SUMMARY

Viewed from one aspect the present invention provides asynchronous bridge circuitry for transferring data from source circuitry operating in a source clock domain to destination circuitry operating in a destination clock domain that is asynchronous with respect to said source clock domain, said asynchronous bridge circuitry comprising:

a first-in-first-out buffer located within said source clock domain, said first-in-first-out buffer comprising a buffer output for coupling to said destination circuitry in said destination clock domain and a plurality buffer registers for storing said data values;

transmission path circuitry having an input end for coupling to said source circuitry and an output end coupled to said first-in-first-out buffer, said transmission path circuitry configured to transmit said data from said source circuitry to said first-in-first-out buffer with a transmission delay corresponding to one or more source clock signals;

write pointer circuitry located within said source clock domain at said output end of said transmission path circuitry and configured to generate a write pointer coupled to said first-in-first-out buffer to select a current write location within said first-in-first-out buffer and corresponding to one of said plurality of buffer registers; and transmission control circuitry located within said source clock domain at said input end of said transmission path circuitry and configured to generate a transmission control signal for controlling whether or not said source circuitry is permitted to send said data to said first-in-first-out buffer, wherein said transmission control circuitry comprises tracking circuitry configured to store one or more tracking values for tracking respective state variables of said first-in-first-out buffer, said transmission control circuitry generating said transmission control signal in dependence upon said one or more tracking values.

The present techniques recognise that while it is desirable for reasons of keeping the circuit wiring overhead low that the first-in-first-out buffer should be located within the source clock domain close to the destination circuitry in the destination clock domain, control also needs to be provided to the source circuitry so that it is prevented from sending data when the first-in-first-out buffer is not able to properly receive and store this data. In order achieve such control, the present technique de-couples the first-in-first-out buffer and the write pointer circuitry for controlling the write location to that first-in-first-out buffer from the transmission control circuitry which controls the source circuitry. This permits the transmission control circuitry to be located at the other end of the transmission path circuitry proximal to the source circuitry. This enables the transmission control circuitry to control the source circuitry without suffering a transmission delay through the transmission path circuitry. In order to achieve such control, the transmission control circuitry includes tracking circuitry which stores one or more tracking values that track respective state variables of the first-in-first-out buffer and so are able to determine whether or not the remotely located first-in-first-out buffer is in a state in which it is able to receive and store data.

It will be appreciated that the tracking values may comprise a variety of different data depending upon the particular implementation chosen. In some implementations, the tracking values include a shadow copy of the write pointer. Such a shadow copy may necessarily be out-of-date relative to the one at the destination end of the transmission path circuitry, due to the multiple clock cycle periods needed for signals to pass through the transmission path circuitry, but since writes originate at the source, the shadow copy may be ahead of the copy that is co-located with the first-in-first-out buffer and accordingly control with be exercised in a manner which will not lead to malfunction, as the transmission control circuitry is able to take account of data that is in-flight through the transmission path circuitry to the first-in-first-out buffer before it actually arrives there.

In other embodiments the one or more tracking values may comprise a count of how many buffer registers within the first-in-first-out buffer are free and accordingly available to receive data. Such an arrangement recognises that the source need not know the actual write pointer position, but more fundamentally need concern itself with whether or not buffer registers are free and able to receive the data to be sent.

In some embodiments read pointer circuitry is located within the destination clock domain and serves to generate a read pointer which is coupled to the first-in-first-out buffer to select a current read location therein. Accordingly, data is written into the first-in-first-out buffer under control of the write pointer and is read from the first-in-first-out buffer under control of the read pointer. A comparison between the read pointer and the write pointer at the first-in-first-out buffer may be made to determine whether or not there is data stored within the first-in-first-out buffer which is available to be read by the destination circuitry.

The read pointer may also in some embodiments be transmitted by the transmission path circuitry to the control circuitry. The one or more tracking values may include a shadow copy of the read pointer. Detecting a difference in the shadow copy of a read pointer held within the transmission control circuitry compared to a latest copy of the read pointer received from the destination enables a change in read pointer to be detected and accordingly indicate that a data value has been read from the first-in-first-out buffer. The reading of a data value indicates that a buffer register has been freed and accordingly the count of available buffer registers may be incremented. It is also possible that the read pointer value sent from the destination may be compared at the transmission control circuitry with the shadow copy of the write pointer to identify when the first-in-first-out buffer is full and accordingly generate a transmission control signal which blocks further transmission.

It is desirable that the number of buffer registers within the first-in-first-out buffer should not be too large in order to reduce the overhead associated with the asynchronous bridge circuitry. In some embodiments buffer operation with reduced overhead may be achieved when the buffer registers comprise N buffer registers where N is an integer value and N is greater than or equal to the sum of the number of clock cycles required to transmit a signal first from the input end to the output end of the transmission path and then return a signal from the output end to the input end. This round-trip latency corresponds to a delay between the source starting to send data and control information being able to returned back to the source indicating that the buffer has become full. Providing sufficient buffer registers to store all of the data which might be received during such a latency period insures that malfunction is avoided. The number of buffer registers could be set to the minimum number required to meet such a latency requirement. It will be acceptable in some embodiments to have fewer than N buffer registers, if full throughput (one payload transmission per cycle) is not required.

It will be appreciated that the transmission path circuitry could take a variety of different forms. In some embodiments the transmission path circuitry may comprise interconnect circuitry configured to provide point-to-point communication between the source circuitry and the destination circuitry. An example of such interconnect circuitry would be that conforming to the AXI protocols designs by ARM Limited of Cambridge, England. Another example of transmission path circuitry would be ring bus circuitry in which data is circulated around a ring bus from a source to a destination passing between intermediate points which may themselves, for different communication instances, also serve as sources of destination.

Another form of transmission path circuitry which may be used in high performance environments is a wave-pipeline bus using which multiple data values may be in-flight along the bus at any given time without a requirement to utilise register stages (buffers) along the bus.

The de-coupling of the transmission control circuitry from the destination end of the transmission path circuitry has implications for proper control during initialisation. In some embodiments the transmission control circuitry may be configured to generate, upon initialisation of the asynchronous buffer circuitry, a transmission control signal which does not permit the source circuitry to send data to the first-in-first-out buffer. Initialising to a state in which transmission is prevented allows time for the appropriate control and tracking values to be set up within the asynchronous circuitry at both ends of the transmission path circuitry before transmission is started.

Viewed from another aspect the present invention provides asynchronous bridge circuitry for transferring data from source circuitry operating in a source clock domain to destination circuitry operating in a destination clock domain that is asynchronous with respect to said source clock domain, said asynchronous bridge circuitry comprising:

first-in-first-out buffer means for storing data values, said first-in-first-out buffer means being located within said source clock domain and comprising a buffer output for coupling to said destination circuitry in said destination clock domain and a plurality buffer register means for storing said data values;

transmission path means for transmitting said data from said source circuitry to said first-in-first-out buffer means with a transmission delay corresponding to one or more source clock signals, said transmission path means having an input end for coupling to said source circuitry and an output end coupled to said first-in-first-out buffer means;

write pointer means for generating a write pointer coupled to said first-in-first-out buffer means to select a current write location within said first-in-first-out buffer means and corresponding to one of said plurality of buffer registers means, said write pointer means being located within said source clock domain at said output end of said transmission path means; and transmission control means for generate a transmission control signal for controlling whether or not said source circuitry is permitted to send said data to said first-in-first-out buffer means, said transmission control means being located within said source clock domain at said input end of said transmission path means, wherein said transmission control means comprises tracking means for storing one or more tracking values for tracking respective state variables of said first-in-first-out buffer means, said transmission control means generating said transmission control signal in dependence upon said one or more tracking values.

Viewed from a further aspect the present invention provides a method of transferring data, using asynchronous bridge circuitry, from source circuitry operating in a source clock domain to destination circuitry operating in a destination clock domain that is asynchronous with respect to said source clock domain, said method comprising the steps of:

storing data values within a first-in-first-out buffer, said first-in-first-out buffer being located within said source clock domain and comprising a buffer output for coupling to said destination circuitry in said destination clock domain and a plurality buffer registers for storing said data values;

transmitting said data from said source circuitry to said first-in-first-out buffer along a transmission path with a transmission delay corresponding to one or more source clock signals, said transmission path having an input end coupled to said source circuitry and an output end coupled to said first-in-first-out buffer;

generating with write pointer circuitry a write pointer coupled to said first-in-first-out buffer to select a current write location within said first-in-first-out buffer and corresponding to one of said plurality of buffer registers, said write pointer circuitry being located within said source clock domain at said output end of said transmission path means;

generating with transmission control circuitry a transmission control signal for controlling whether or not said source circuitry is permitted to send said data to said first-in-first-out buffer, said transmission control circuitry being located within said source clock domain at said input end of said transmission path circuitry; and storing within said transmission control circuitry one or more tracking values for tracking respective state variables of said first-in-first-out buffer, wherein said step of generating said transmission control signal is dependent upon said one or more tracking values.

In some embodiments the initialisation of the asynchronous bridge circuitry may comprise a sequence of steps performed in the following order. A transparent transmission control signal not permitting the source circuitry to send data may first be generated. This effectively applies "backpressure" to the source until initialisation has been completed. A request signal may then be transmitted along the transmission path from the input end to the output end. When the request signal is received at the output end, this may trigger the initialisation of pointer values at the output end, such as at least the write pointer. When the pointers have been initialised, an acknowledge signal may be sent back along the transmission path from the output end to the input end. At the input end, receipt of the acknowledged signal may trigger removal of the transmission control signal that does not permit the source circuitry to send data and operation of the transmission control circuitry and start generating a transmission control signal for controlling whether or not the source circuitry is permitted to send data in dependence upon the tracked values may as the tracked values have now been properly set up and initialised.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1A:
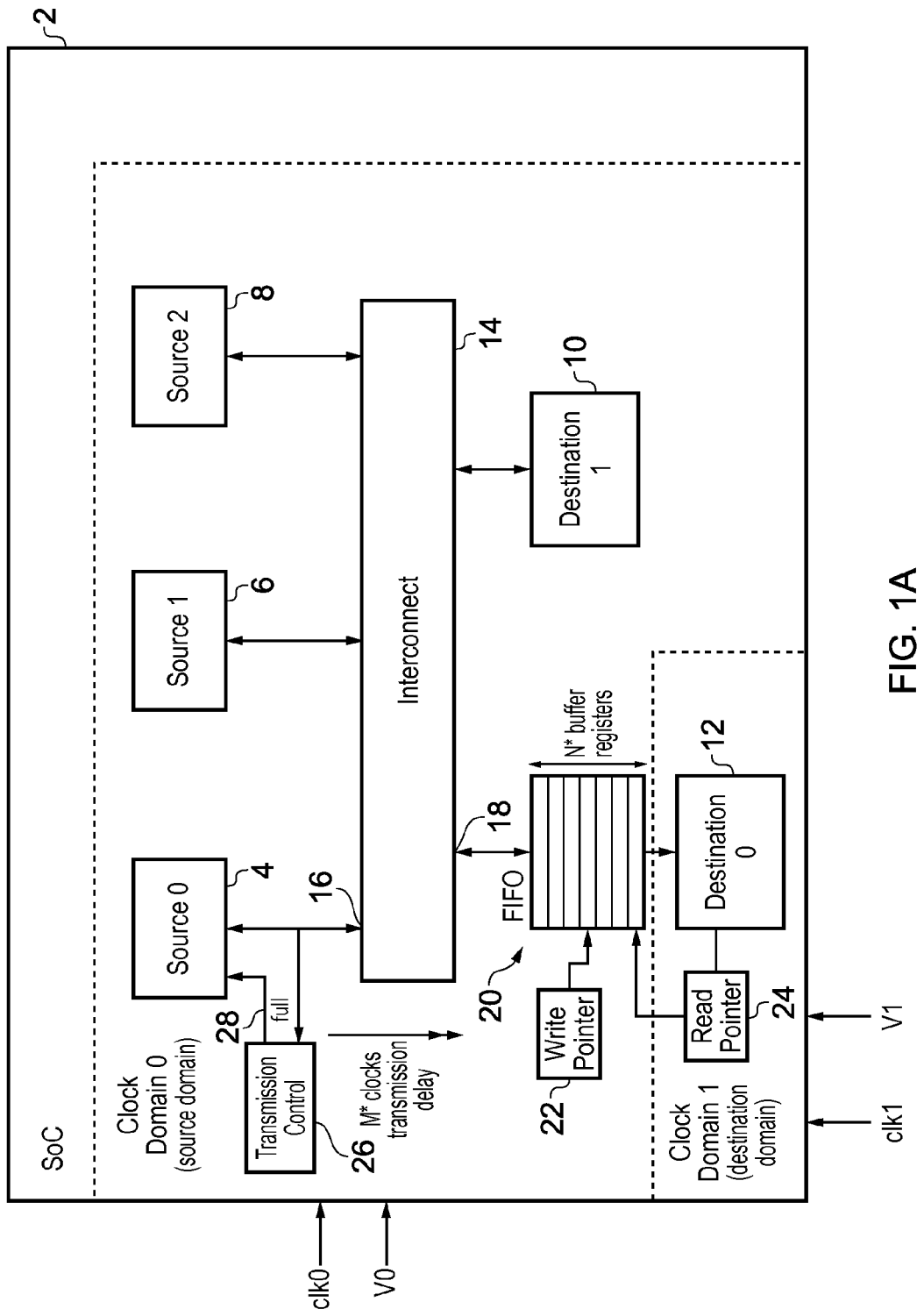
FIGS. 1A, 1B and 1C schematically illustrates different example embodiments of an integrated circuit incorporating asynchronous bridge circuitry.

FIG. 1A schematically illustrates apparatus for processing data in the form of a system-on-chip integrated circuit 2. The system-on-chip integrated circuit 2 incorporates three instances of source circuitry 4, 6, 8 all disposed within the domain of and operating under control of a clock signal clk0 of a first clock domain. The first clock domain operates at a voltage of V0. One instance of destination circuitry 10 is also disposed in this first clock domain.

A second clock domain controlled by second clock signal clk1 and operating under control of a second voltage V0 includes destination circuitry 12.

The clock signal clk0 may serve as the source clock signal for the source clock domain (clock domain 0). The clock signal clk1 may serve as the destination clock signal for the destination domain (clock domain 1). It will be appreciated that the source domain need not contain only source circuitry and the destination domain need not contain only destination circuitry. However, with respect to the asynchronous bridge circuitry to be described further below, the source domain contains the source circuitry for that asynchronous bridge circuitry and the destination domain contains destination circuitry for the asynchronous bridge circuitry.

Also illustrated in FIG. 1A is transmission path circuitry in the form of point-to-point interconnect circuitry 14 (e.g. and AXI interconnect). As will be understood by those familiar with this technical field the interconnect circuitry 4 includes routing, buffering and other circuits which establish point-to-point communication between a desired source and a desired destination for write operations. Multiple clock signals of the source clock domain (clk0 clock periods) are required for write data to pass from an input end 16 to an output end 18 of the interconnect 14. This corresponds to a transmission delay of m clock cycles. Source circuitry 4 is coupled to the input end 16 of the interconnect 14. A first-in-first-out buffer 20 is connected to the output end 18 of the interconnect circuitry 14. The first-in-first-out buffer 20 includes N buffer registers, where N is a positive integer value. These buffer registers are each capable of storing a data value written from the source circuitry 4. In the case where the transmission delay through the interconnect 14 from the input end 16 to the output end 18 and then back from the output end 18 to the input end 16 corresponds to six clk0 clock periods, then six buffer registers are provided. This provides sufficient storage for all in-flight data values sent from the source circuitry 4 to the first-in-first-out buffer 20 before control signals can get back to the source circuitry 4 to indicate that the first-in-first-out buffer 20 should be assumed to be full.

Write pointer circuitry 22 is located within the source clock domain (clock domain of clk0) proximal to the first-in-first-out buffer 20 and generates a write pointer which is supplied to the first-in-first-out buffer 20 to select a current write location therein at which a next data value, when received, will be written. Read pointer circuitry 24 is located within the destination clock domain (domain of clock clk1) and serves to generate a read pointer value which is supplied to the first-in-first-out buffer 20 and serves to select a current read location from which a data value will be read to the destination circuitry when available.

Located at the input end 16 of the interconnect 14 and proximal to the source circuitry 4 is transmission control circuitry 26. The transmission control circuitry 26 receives signals passed back from the output end 18 of the interconnect 14 to enable it to store and maintain tracking values which track the state of the first-in-first-out buffer 20. These tracking values may include a shadow write pointer value, a shadow read pointer value and/or a count value indicative of how many free buffer registers there are within the first-in-first-out buffer 20. The transmission control circuitry 26 uses these tracking values to generate a transmission control signal 28 which is supplied to the source circuitry 4 and so as to control whether or not the source circuitry 4 is able to transmit data to the destination circuitry 12. In this example embodiment the transmission control circuitry 26 is indicated as generating a "full" signal which, when asserted, applies backpressure to the source circuitry 4 and prevents further transmission of data therefrom.

The asynchronous bridge circuitry in the example embodiment of FIG. 1A may be considered to be formed of the transmission control circuitry 26, the interconnect circuitry 14, the first-in-first-out buffer 20, the write pointer 22 and the read pointer 24. It will be appreciated that the asynchronous bridge circuitry may in practice include further elements which have been omitted from FIG. 1A for the sake of clarity, such as circuits for resolving metastability issues associated with transferring signals across clock boundaries and synchronisation issues associated with transferring signals across clock boundaries.

Figure 1B:
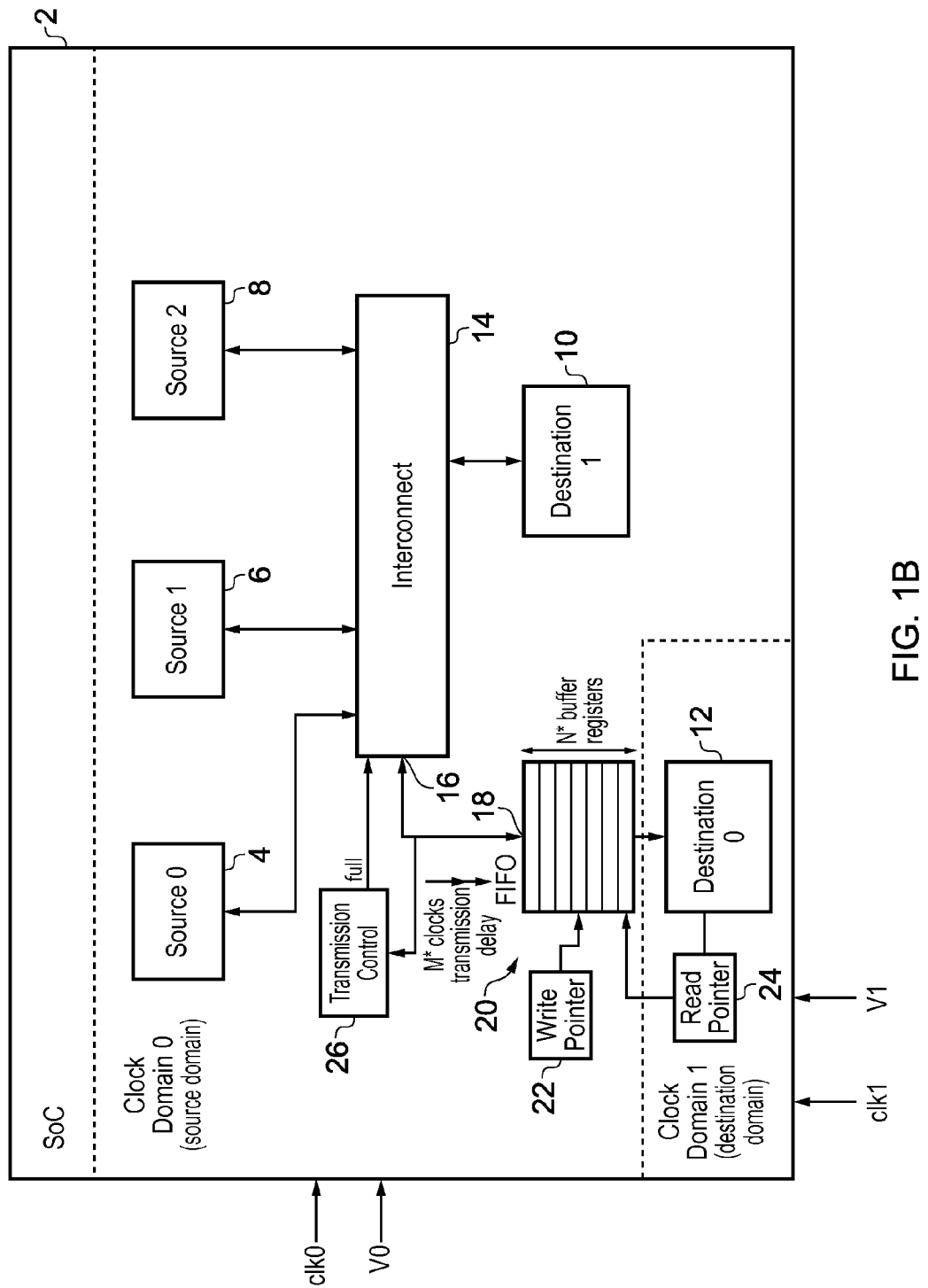

FIG. 1B schematically illustrates a system-on-chip integrated circuit incorporating asynchronous bridge circuitry similar to that illustrated in FIG. 1A, but with the transmission path circuitry formed as the circuitry between the interconnect circuitry 14 and the destination circuitry 12. The input end 16 of the transmission path circuitry is the output of the interconnect circuitry 14. There is an m clock cycle transmission delay through the transmission path circuitry (which may include registers/buffers—not illustrated). The output from the interconnect circuitry serves as the source circuitry at which "backpressure" is applied to stop data being sent as describe above. The transmission control circuitry 26 applies the transmission control signal to the output from the interconnect circuitry.

Figure 1C:
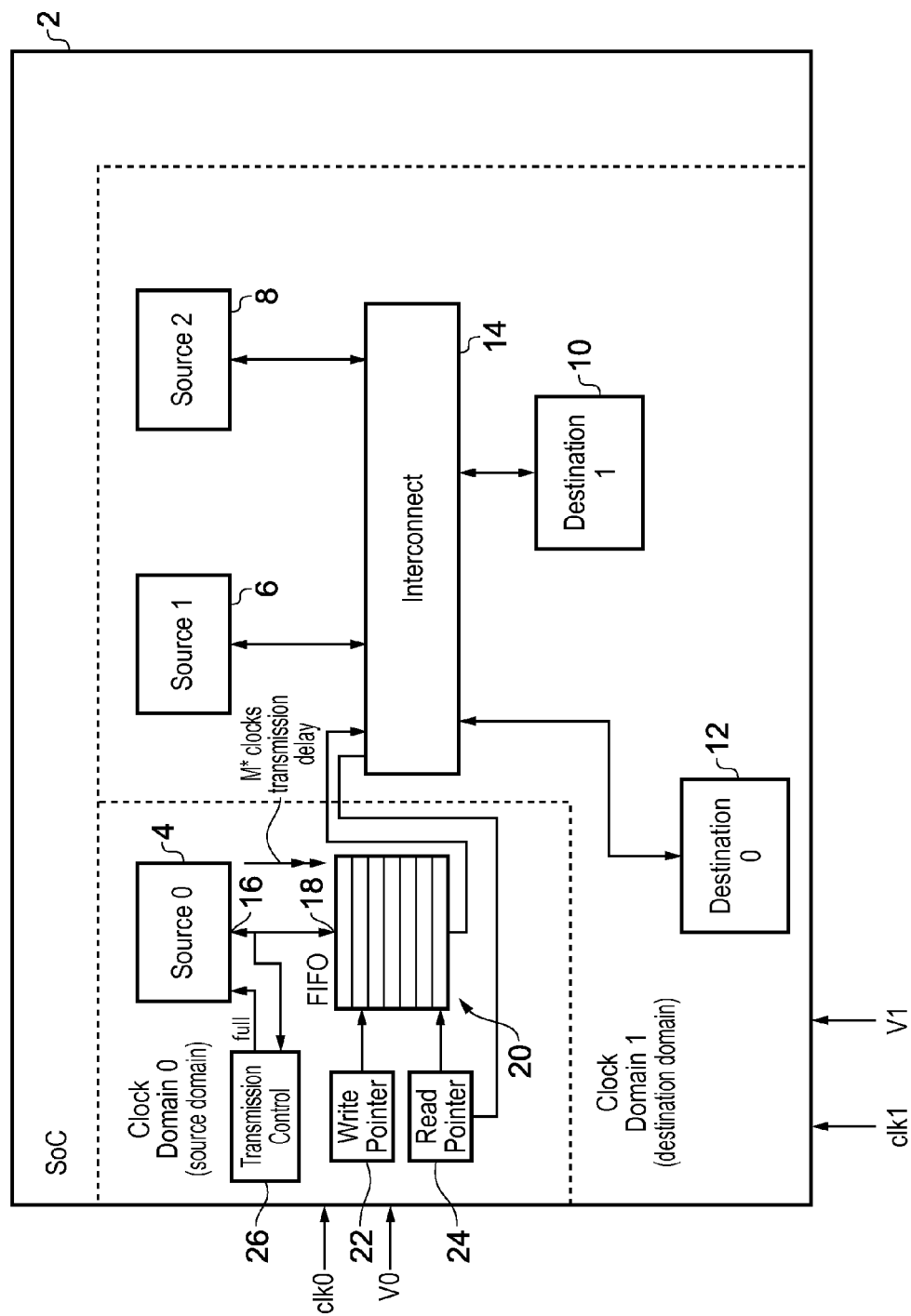

FIG. 1C schematically illustrates a system-on-chip integrated circuit incorporating asynchronous bridge circuitry similar to that illustrated in FIG. 1A. The asynchronous bridge circuitry is located before the input to the interconnect circuitry 14 from the source circuitry 4. The input to the interconnect circuitry 14 serves as the destination circuitry for the asynchronous bridge circuitry and is in a different clock domain therefrom as illustrated. The transmission path circuitry is between the source circuitry 4 and the first-in-first-out buffer 20 and has a transmission delay of m clock cycles (and may include multiple registers/buffers—not illustrated). The read pointer 24 signals to the input of the interconnect circuitry 14 when there is a data value stored in the first-in-first-out buffer 20 ready to be read.

It will be appreciated that the asynchronous bridge circuitry using the present techniques may be employed in the other embodiments/arrangement than those illustrated in FIGS. 1A, 1B and 1C, FIG. 2 schematically illustrates the first example of asynchronous bridge circuitry. In this example the transmission control circuitry 26 includes a register 28 storing a shadow copy of the write pointer which is supplied to the first-in-first-out buffer 20. A multiplexer 30 acting under control of the read pointer serves to select one of the buffer registers for coupling to the destination circuitry. A comparator 32 serves to determine if the current write pointer at the first-in-first-out buffer 20 differs from the current read pointer. If this is the case, then this indicates that has at least one data value is available for reading and accordingly a read operation is triggered followed by an increment, using increment circuitry 34, of the read pointer value.

The read pointer value from the read pointer circuitry 24 is passed through the transmission path circuitry to the transmission control circuitry 26. At the transmission control circuitry 26, a comparator 36 serves to compare the read pointer value to the write pointer value. Such a comparison can identify when all of the buffer registers within the first-in-first-out buffer 20 are full and accordingly trigger generation of a "full" signal 28 which is supplied to the source circuitry 4.

Within the transmission control circuitry 26, when a data value is transmitted from the source circuitry 4 to the first-in-first-out buffer 20, then an increment is applied to the shadow write pointer held within register 28. The same write enable signal is transmitted through the transmission path to the write pointer circuitry 22 proximal to the first-in-first-out buffer and triggers an increment in the write pointer value held there at the same time as the data value arrives to be stored within the first-in-first-out buffer 20 (or at least in the immediately following clock cycle as appropriate).

Figure 2:
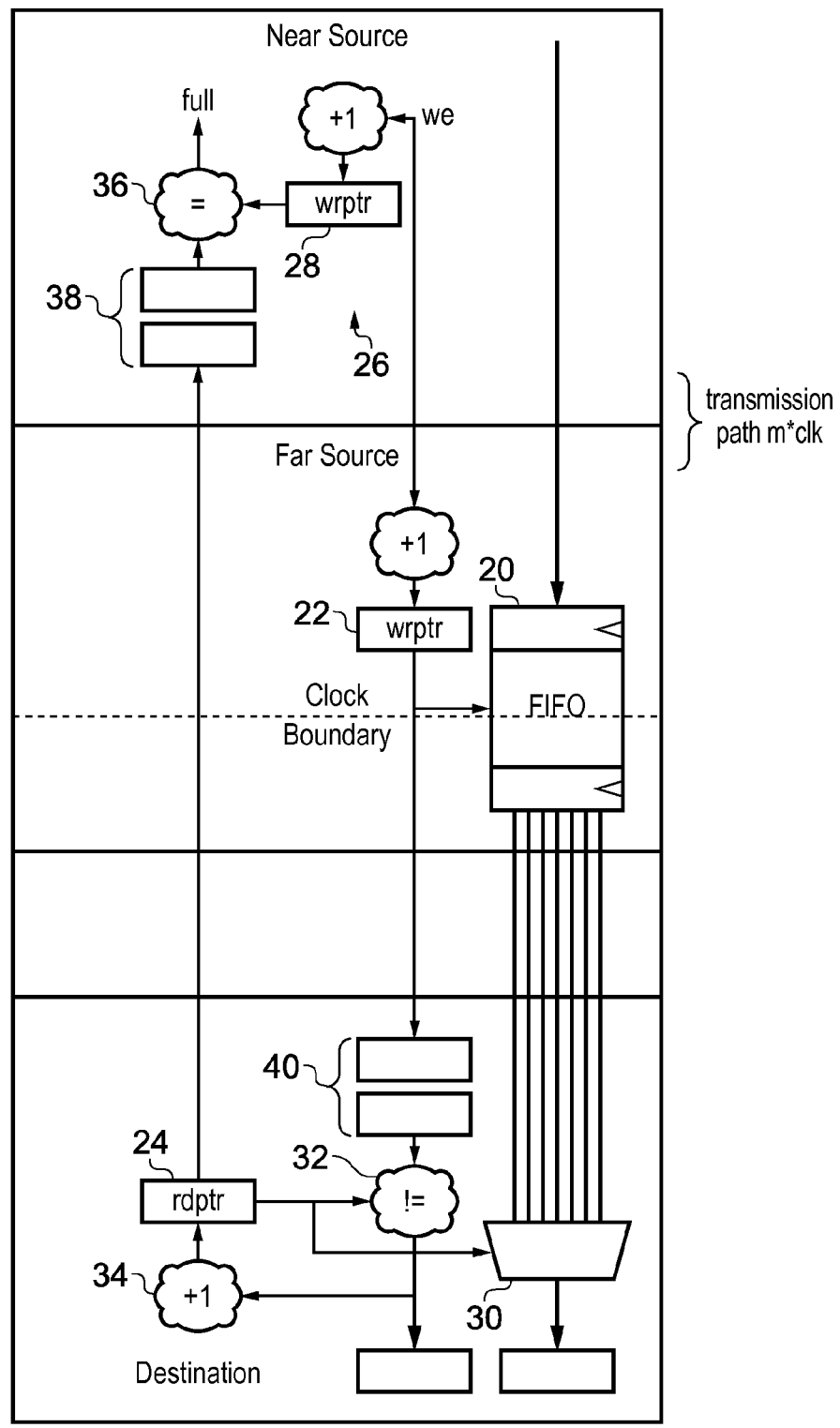
FIG. 2 schematically illustrates an example of asynchronous bridge circuitry.

Also illustrated in FIG. 2 are synchronisation and metastability resolving registers 38, 40 which serve to synchronise and remove metastability from signal values passed across clock boundaries in accordance with conventional techniques.

As will be seen from FIG. 2, the transmission control circuitry 26 is de-coupled from the first-in-first-out buffer circuitry 20 and is located near the source circuitry 4 at the far side of the transmission path circuitry 14. This permits a backpressure signal to be locally generated for the source circuitry 4 in a manner that permits the asynchronous bridge circuitry to be used with transmission paths with multiple clock cycle latency without an undue increase in first-in-first-out buffer 20 storage capacity being required.

Figure 3:
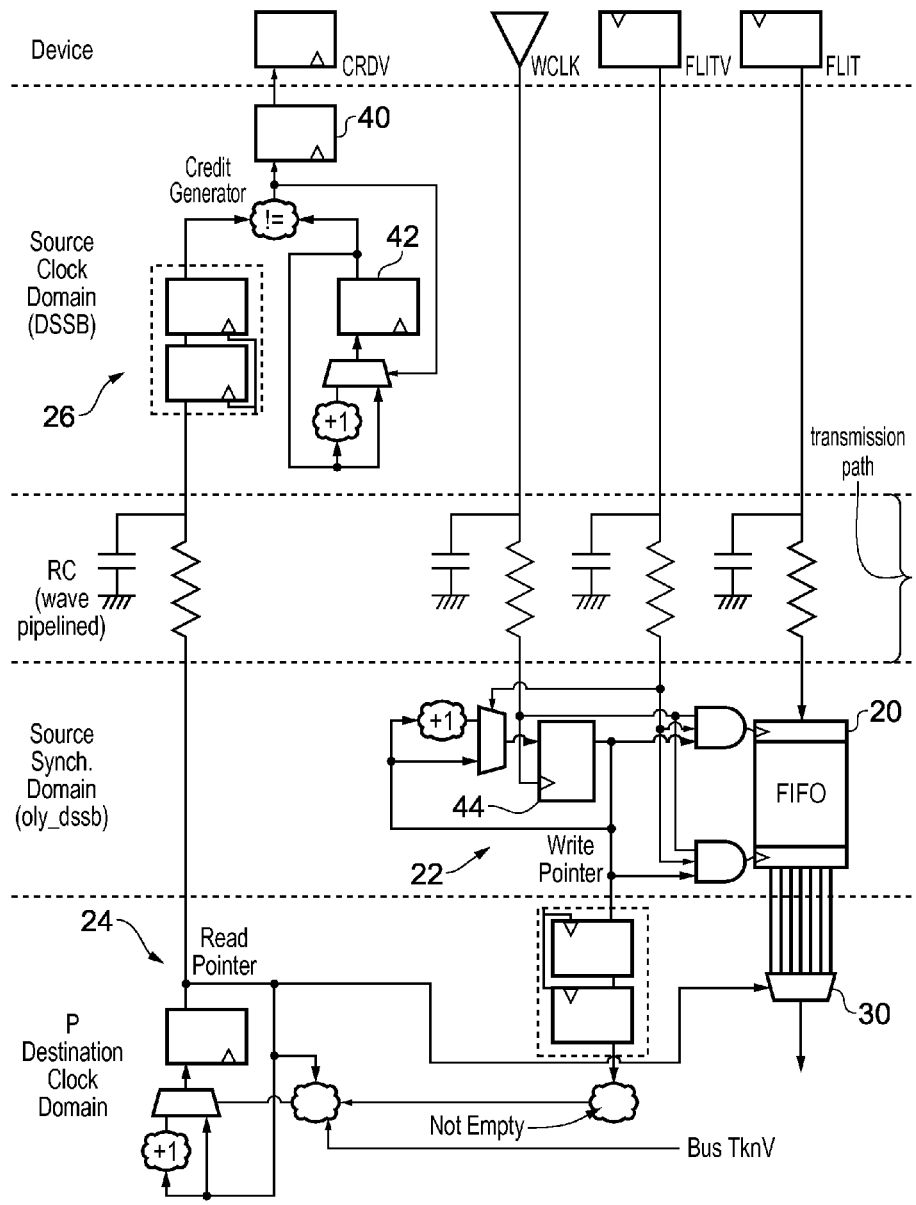
FIG. 3 schematically illustrates a second example of asynchronous bridge circuitry.

FIG. 3 schematically illustrates a second example asynchronous bridge circuit. In this example the tracking values maintained within the transmission control circuitry include a count credit (or token) signal 40 (a one bit value) which indicates permission to transmit one data value to the first-in-first-out buffer 20. A shadow read pointer value is stored within a shadow read pointer register 42 maintained within the transmission control circuitry 26. The current read pointer value generated by the read pointer circuitry 24 is sent through the transmission path to the transmission control circuitry 26, where it is synchronised into the source clock domain and compared with the shadow read pointer. When the read pointer value changes, then this indicates that a data value has been read from the first-in-first-out buffer 20 and accordingly an empty space has been generated. When a data value is sent from the source circuitry to the destination circuitry, the transmission control circuitry 26 will have direct local access to this information and can decrement the value for free spaces within the first-in-first-out buffer 20.

The write pointer circuitry 22 includes a write pointer register 44 storing a write pointer value. This write pointer value is incremented when a write clock signal WCLK is received. Thus, the write pointer value need not be generated at the source circuitry and passed through the transmission path circuitry 14, rather the write clock WCLK can be tracked and used to increment (update) a write pointer value maintained in the write pointer circuitry 22 which is local to the first-in-first-out buffer 20 at the output end 18 of the transmission path circuitry 14.

The read pointer circuitry 24 compares the write pointer value with the current read pointer value to determine whether or not the first-in-first-out buffer 20 is empty and, if this is not empty, then trigger a read of a data value from the first-in-first-out buffer 20 may be performed via the multiplexer 30 (switched under control of the read pointer value).

The transmission path illustrated in FIG. 3 is in the form of a wave-pipelined bus of the type of which will be familiar to those in this technical field. Other forms of transmission path circuitry may also be employed, such as a register pipelined bus or a ring bus in which data values circulate around the ring between source circuitry and destination circuitry by one or more intermediate source/destination circuits (nodes). The present techniques may be employed with all of the above types of transmission path circuitry as well as other transmission path circuitry where multiple clock cycle latencies are present.

Figure 4:
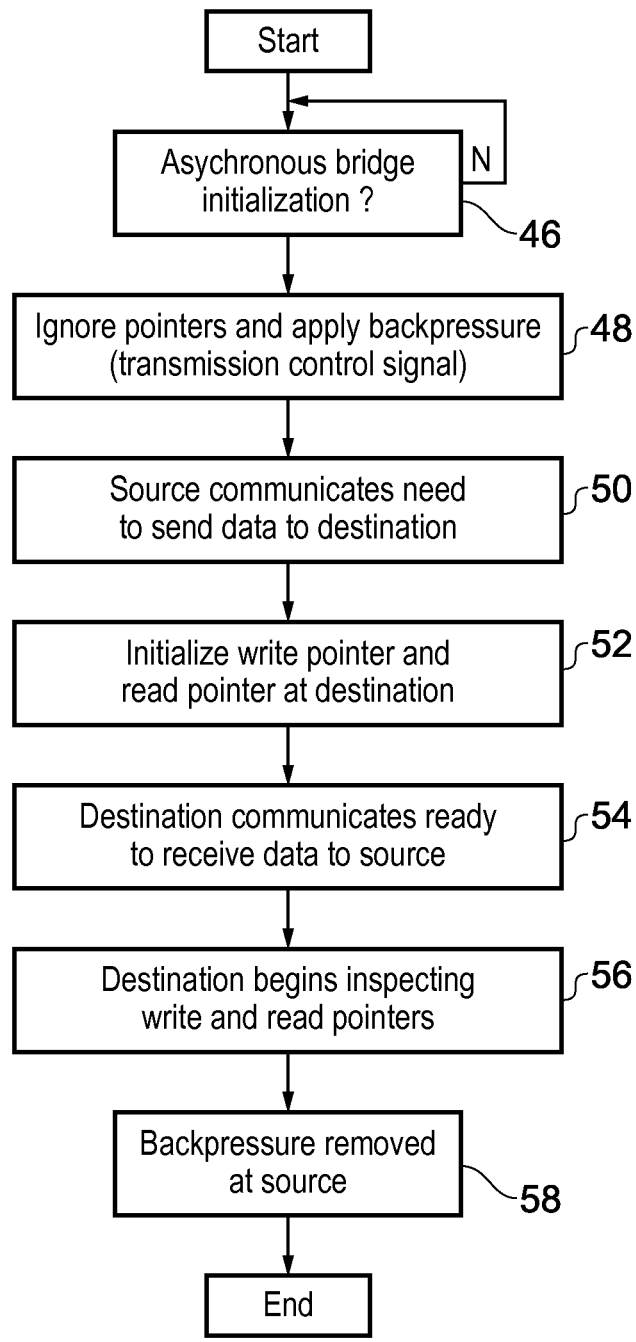
FIG. 4 is a flow diagram schematically illustrating initialisation of the asynchronous bridge circuitry of FIG. 3.

FIG. 4 is a flow diagram schematically illustrating the initialisation of the asynchronous bridge circuitry. At step 46 processing waits until the asynchronous bridge circuitry is to be initialised. Step 48 then serves to switch to a state in which the read pointers and write pointers are ignored (both in their main and shadow copy forms) and the transmission control circuitry 26 serves to generate a backpressure signal ("full" transmission control signal). At step 50 the source circuitry then communicates via the transmission path circuitry 14 a control signal indicating that it needs to send data to the destination. At the destination circuitry end of the transmission path circuitry 14, the write pointer and the read pointer value are initialised when the request signal sent at step 50 is received. At step 54 the destination communicates back to the source an acknowledge signal indicating that the destination is now ready to receive data from the source. Step 56 corresponds to the destination circuitry beginning to inspect the read pointer and the write pointer to determine whether or not the first-in-first-out buffer contains data to be read by the destination circuitry 12. At step 58 the transmission control circuitry 26 serves to remove the backpressure signal and so permit the source circuitry 4 to start sending data. It will be appreciated that steps 56 and 58 are shown sequentially whereas in practice these steps may be performed in parallel, or in the reverse order. Such variations are encompassed with the present techniques.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Asynchronous bridge circuitry for transferring data from source circuitry operating in a source clock domain to destination circuitry operating in a destination clock domain that is asynchronous with respect to said source clock domain, said asynchronous bridge circuitry comprising:
a first-in-first-out buffer located within said source clock domain, said first-in-first-out buffer comprising a buffer output for coupling to said destination circuitry in said destination clock domain and a plurality buffer registers for storing said data values;
transmission path circuitry having an input end for coupling to said source circuitry and an output end coupled to said first-in-first-out buffer, said transmission path circuitry configured to transmit said data from said source circuitry to said first-in-first-out buffer with a transmission delay corresponding to one or more source clock signals;
write pointer circuitry located within said source clock domain at said output end of said transmission path circuitry and configured to generate a write pointer coupled to said first-in-first-out buffer to select a current write location within said first-in-first-out buffer and corresponding to one of said plurality of buffer registers; and
transmission control circuitry located within said source clock domain at said input end of said transmission path circuitry and configured to generate a transmission control signal for controlling whether or not said source circuitry is permitted to send said data to said first-in-first-out buffer, wherein
said transmission control circuitry comprises tracking circuitry configured to store one or more tracking values for tracking respective state variables of said first-in-first-out buffer, said transmission control circuitry generating said transmission control signal in dependence upon said one or more tracking values.

2. Asynchronous bridge circuitry as claimed in claim 1, wherein said one or more tracking values comprises a shadow copy of said write pointer.

3. Asynchronous bridge circuitry as claimed in claim 1, wherein said one or more tracking values comprises a count of how many buffer register are free.

4. Asynchronous bridge circuitry as claimed in claim 1, comprising read pointer circuitry located within said destination clock domain and configured to generate a read pointer coupled to said first-in-first-out buffer to select a current read location within said first-in-first-out buffer and corresponding to one of said plurality of buffer registers.

5. Asynchronous bridge circuitry as claimed in claim 4, wherein said read pointer is transmitted to said transmission control circuitry via said transmission path circuitry.

6. Asynchronous bridge circuitry as claimed in claim 5, wherein said one or more tracking values comprises a shadow copy of said read pointer.

7. Asynchronous bridge circuitry as claimed in claim 5, wherein said transmission control circuitry is configured to generate said transmission control signal in dependence upon a comparison of said read pointer with one or more of said tracked values.

8. Asynchronous bridge circuitry as claimed in claim 4, comprising a multiplexer located within said destination clock domain and configured to select for output to said destination circuitry data stored within one of said plurality of buffer registers in dependence upon said read pointer.

9. Asynchronous bridge circuitry as claimed in claim 1, wherein said plurality of buffer registers comprises N buffer registers, where N is an integer value, and N is greater than or equal to a sum of a first number of source clock cycles required for signal transmission along said transmission path circuitry from said input end to said output end with a second number of source clock cycles required for signal transmission along said transmission path circuitry from said output end to said input end.

10. Asynchronous bridge circuitry as claimed in claim 1, wherein said transmission path circuitry comprises interconnect circuitry configured to provide point-to-point communication between said source circuitry and said destination circuitry.

11. Asynchronous bridge circuitry as claimed in claim 1, wherein said transmission path circuitry comprises ring bus circuitry configured to provide communication between said source circuitry and said destination circuitry by transmitting said data around said ring bus.

12. Asynchronous bridge circuitry as claimed in claim 1, wherein said transmission path circuitry comprises a wave-pipelined bus.

13. Asynchronous buffer circuitry as claimed in claim 1, wherein said transmission control circuitry is configure to generate, upon initialization of said asynchronous buffer circuitry, a transmission control signal not permitting said source circuitry to send said data to said first-in-first-out buffer.

14. Asynchronous buffer circuitry as claimed in claim 13, wherein said transmission control circuitry is configured to maintain said transmission control signal with a value not permitting said source circuitry to send said data to said first-in-first-out buffer until initialization of said asynchronous buffer circuitry at both said input end and said output end of said transmission path circuitry is complete.

15. Asynchronous bridge circuitry for transferring data from source circuitry operating in a source clock domain to destination circuitry operating in a destination clock domain that is asynchronous with respect to said source clock domain, said asynchronous bridge circuitry comprising:
means for storing data values, said means for storing being located within said source clock domain and comprising an output for coupling to said destination circuitry in said destination clock domain and a plurality register means for storing said data values;

means for transmitting said data from said source circuitry to said means for storing with a transmission delay corresponding to one or more source clock signals, said means for transmitting having an input end for coupling to said source circuitry and an output end coupled to said means for storing;

write pointer means for generating a write pointer coupled to said first-in-first-out buffer means to select a current write location within said first-in-first-out buffer means and corresponding to one of said plurality of buffer registers means, said write pointer means being located within said source clock domain at said output end of said transmission path means; and means for generating a transmission control signal for controlling whether or not said source circuitry is permitted to send said data to said means for storing, said means for generating being located within said source clock domain at said input end of said means for transmitting, wherein said means for generating comprises tracking means for storing one or more tracking values for tracking respective state variables of said means for storing, said means for generating being configured to generate said transmission control signal in dependence upon said one or more tracking values.

16. A method of transferring data, using asynchronous bridge circuitry, from source circuitry operating in a source clock domain to destination circuitry operating in a destination clock domain that is asynchronous with respect to said source clock domain, said method comprising the steps of:

storing data values within a first-in-first-out buffer, said first-in-first-out buffer being located within said source clock domain and comprising a buffer output for coupling to said destination circuitry in said destination clock domain and a plurality buffer registers for storing said data values;

transmitting said data from said source circuitry to said first-in-first-out buffer along a transmission path with a transmission delay corresponding to one or more source clock signals, said transmission path having an input end coupled to said source circuitry and an output end coupled to said first-in-first-out buffer;

generating with write pointer circuitry a write pointer coupled to said first-in-first-out buffer to select a current write location within said first-in-first-out buffer and corresponding to one of said plurality of buffer registers, said write pointer circuitry being located within said source clock domain at said output end of said transmission path means;

generating with transmission control circuitry a transmission control signal for controlling whether or not said source circuitry is permitted to send said data to said first-in-first-out buffer, said transmission control circuitry being located within said source clock domain at said input end of said transmission path circuitry; and storing within said transmission control circuitry one or more tracking values for tracking respective state variables of said first-in-first-out buffer, wherein said step of generating said transmission control signal is dependent upon said one or more tracking values.

17. A method as claimed in claim 16, wherein initializing said asynchronous bridge circuitry comprises the steps of:

generating with said transmission control circuitry a transmission control signal not permitting said source circuitry to send said data to said first-in-first-out buffer;

transmitting a request signal along said transmission path from said input end to said output end;

following receipt of said request signal at said output end, initializing at least said write pointer;

transmitting an acknowledge signal along said transmission path from said output end to said input end;

removing said transmission control signal not permitting said source circuitry to send said data to said first-in-first-out buffer; and starting operation of said transmission control circuitry to generate said transmission control signal for controlling whether or not said source circuitry is permitted to send said data to said first-in-first-out buffer.

* * * * *